(12) United States Patent
Hodge

(10) Patent No.: US 6,438,702 B1
(45) Date of Patent: Aug. 20, 2002

(54) METHOD FOR PROVIDING A PRECISE NETWORK TIME SERVICE

(75) Inventor: James E. Hodge, Fair Haven, NJ (US)

(73) Assignee: Telcordia Technologies, Inc., Morristown, NJ (US)

(*) Notice: Subject to any disclaimer, the term of this patent is extended or adjusted under 35 U.S.C. 154(b) by 0 days.

(21) Appl. No.: 09/468,669

(22) Filed: Dec. 21, 1999

(51) Int. Cl.⁷ .............................. G06F 1/04; G06F 1/12
(52) U.S. Cl. ...................................... 713/400; 713/503
(58) Field of Search ........................... 713/400, 500, 713/503, 600

(56) References Cited

U.S. PATENT DOCUMENTS

| | | | | |
|---|---|---|---|---|
| 4,926,446 A | * | 5/1990 | Grover et al. ............... | 375/358 |
| 5,408,506 A | * | 4/1995 | Mincher et al. ............ | 375/356 |
| 5,704,030 A | * | 12/1997 | Kanzaki ..................... | 714/12 |
| 6,009,530 A | * | 12/1999 | Goatly ....................... | 713/400 |
| 6,199,169 B1 | * | 3/2001 | Voth ......................... | 713/400 |

* cited by examiner

*Primary Examiner*—Dennis M. Butler
(74) *Attorney, Agent, or Firm*—Joseph Giordano

(57) ABSTRACT

A precise network time service that provides synchronization and time of day information. In accordance with my invention a user or customer premise equipment initiates the process by requesting time service from a network time server. The server responds by sending operation, administration, and maintenance (OAM) cells to the requesting party. These cells are immediately looped back to the time server and used to derive a minimum round trip time. Based on the minimum round trip time, the time server and the requesting party's equipment are subsequently synchronized. Once synchronized, delay measurements are used to maintain synchronism and provide time of day information so that such practical network problems as congestion may be monitored.

8 Claims, 3 Drawing Sheets

METHOD FOR PROVIDING A PRECISE NETWORK TIME SERVICE

FIELD OF THE INVENTION

This invention relates to providing timing information in communications networks and specifically to providing frequency and universal time information in communications networks.

BACKGROUND OF THE INVENTION

Communications networks are required to deliver a variety of services over expansive geographic areas. With the increasing demand for multimedia services these networks are more and more required to deliver information that the networks were not initially designed for. Consequently new methods are constantly being developed to modify the network or enhance past network functions so that new services can be offered while meeting quality of service requirements. In some instances not only has the network proven inefficient in implementing new services but many strategies and concepts that were previously satisfactory have proven less useful as new services are conceived.

These new services deliver many different forms of information, including text, voice, and video to many different users; that information may be conveniently classified as either a time based stream or a non-time based stream. A time-based stream is a continuous flow of time sensitive information. That is, a time-based stream contains information wherein a timing component associated with each unit of information must be received or played back according to the timing component relative to the other units of information. For example, when either audio or video information is sent directly to a human interface, the time position of each unit of audio or video information is critical to the intelligible reception of the information. As a consequence, time based information places strict delay, bandwidth, and loss rate requirements on communications networks as the information must often be transported as a contiguous unit. In contrast, non-time based streams do not place the same constraints on the network. This is the case because non-time based information streams contain information that is for later consumption. Some examples of non-real time information include email messages or files. These forms of information may, for example, be held in queue until network bandwidth is available for transmittal.

Whether the information stream traversing the network is time-based or non-timed based, network timing information plays an important role in the operation of communications networks. In particular, as the information arrives at a Customer Premise Equipment (CPE), the CPE may have to recover precise frequency and universal time (i.e., time of day) information and make other time related measurements.

In order for transmitted data to be recovered at a receiver the transmitter and receiver must be synchronized. This typically requires the recovery of the frequency of the incoming data stream. The conventional approach to synchronization in the public switched telephone network (PSTN) has been to employ a hierarchical structure of progressively more accurate clocks. At the top of the hierarchy was the most accurate clock source. Signals from the clock source at the top of the hierarchy propagated downstream through the network to less accurate clocks and eventually to the network elements transporting the information. This approach to clock distribution worked quite well for the circuit switched PSTN because the PSTN essentially delivered information continuously in real time to its destination.

The PSTN hierarchical approach to timing distribution, however, has provided some complications for packet switched networks. In packet switched networks traffic patterns are often bursty, i.e., the information may not be transmitted continuously in real time to its destination. Therefore, a particular receiver is not always receiving information from a particular transmitter. When a packet is eventually received and timing information is recovered, the receiver clock may be skewed relative to the transmitter clock. Accordingly, departures from the hierarchical approach for synchronizing nodes in packet switched networks had to be made to reliably deliver information.

One such departure has been the use of universal time information. Universal time information is used to monitor the performance of cell based networks. For example, the time of day may be used to measure delay and throughput. In practice, a cell leaving its origination point may be stamped with the time of the day according to the originating CPE. When that cell arrives at its destination point, the time of day placed into the cell may be compared to the time of the day at the destination point. The difference between the time at the origination and destination points is a measure of the delay through the network.

Another departure from the approach to timing used in the PSTN is deployment of algorithms or protocols that are transmitted with and used to interpret the timing information communicated between a timing source and destination in a packet switch network. Different protocols have been developed throughout the communications industry to provide synchronization and universal time information in cell based networks. One such protocol is the Network Timing Protocol (NTP). NTP provides the mechanisms to synchronize and coordinate time distribution in a large, diverse internet operating at rates from a few kilobits/second to lightwave rates, e.g., gigabit/second. NTP uses a returnable-time design in which a distributed subnet of time servers operating in a self-organizing, hierarchical-master-slave configuration synchronizes local clocks within the subnet and to national time standards via wire or radio. The servers can also redistribute reference time via local routing algorithms and time daemons. NTP provides the protocol mechanisms to synchronize time in principle to precision on the order of nanoseconds while preserving a non-ambiguous date.

Architecturally, NTP requires a number of primary reference sources that are synchronized by wire or radio to national standards, e.g., the atomic clock in Boulder, Colo. These primary reference sources are operated as primary time servers and are usually connected to national standards by Global Positioning Systems (GPS). These primary time servers are connected to widely accessible resources such as backbone gateways. Subsets of these backbone gateways or local net hosts act as secondary time servers. By using NTP time keeping information is communicated from the primary time servers to other time servers over the internet. As such, the architecture over which NTP is deployed is similar to that implemented in the digital telephone system. The information communicated from these primary time servers is used to cross-check clocks and make up for errors due to equipment or propagation delay. The secondary servers run NTP along with one or more primary servers. In order to simplify the protocol the secondary servers distribute timing via NTP to the remaining local-net hosts.

In the end NTP is designed to produce three outputs: (1) clock offset, (2) roundtrip delay, and (3) dispersion. In simple terms, clients, e.g., workstations, transmit NTP messages requesting from the secondary time servers information that allow the clients to determine the server time with respect to the local client time and to adjust the local client clock.

NTP has some inherent limitations. While NTP can be used for monitoring delay and throughput, it achieves 1–50 millisecond accuracy. This translates to an accuracy of more than 17,000 cell periods on a 156 Mb/s link and more than 700,000 cell periods on a 622 Mb/s link. At such rates, transient congestion will be extremely difficult, if not impossible, to diagnose using the NTP protocol. Furthermore, in order to achieve millisecond accuracy NTP requires the use of complex and intricate algorithms.

Adaptations to NTP, such as Simple Network Timing Protocol (SNTP), have been implemented that allow delivery of time accurate to the order of microseconds without the complexity of the NTP. SNTP has some drawbacks. A SNTP client cannot be the source of timing for another SNTP or NTP client. Furthermore, SNTP servers must be synchronized by a stratum 1 source directly provided from a reliable radio or time service. Finally, SNTP is not as reliable as NTP and is usually not recommended for use in primary servers. As such, SNTP, while providing adequate accuracy, presents many limitations as to its use.

Accordingly, a method for providing precise frequency and universal time information and related time measurements at CPEs without the need for special or expensive components, such as GPS receivers, while having better than millisecond accuracy would be of utility.

SUMMARY OF THE INVENTION

My invention is a method for providing precise frequency and universal time information and related measurements at a CPE without the need for special and expensive components such as GPS hardware.

By my method after the CPE requests service activation, the minimum round trip time between a time server and the CPE is calculated. Based on the minimum round trip time the CPE and time server are synchronized. Once synchronized the time server and CPE then continually compensate for different transmit or receive delays based on the minimum round trip time. Based on these simple steps the time server and CPE maintain synchronization accurately without the complexity of the NTP.

An advantage of my invention is that several unidirectional cell/frame delay measurements may be obtained including end-to-end propagation delay, congestion, cell delay variation, cell transfer delay, and traffic throughput.

My invention is also advantageously approximately 100 times more accurate than NTP, providing accuracy of approximately 10 microseconds.

My invention also advantageously allows network traffic to be time stamped and correlated with any other network element supported by a time server anywhere in the world.

In addition, as previously mentioned, my invention allows for unidirectional and bidirectional delay measurements. This represents an improvement over prior art performance monitoring tools such as ping and traceroute which can measure delay but usually rely on roundtrip times. As such, these tools cannot distinguish the difference between delays in the forward and reverse directions. Because my invention does not depend on end-to-end loop back timing, I am able to accurately measure uni-directional delay which is a fundamental improvement over the prior art.

My invention is also able to accurately monitor one of the most common network problems, congestion. As those in the art are aware, the best method for monitoring congestion is to monitor the queue lengths of all the nodes used in a virtual connection. However, monitoring in this manner is rather complex. In contrast my invention offers a simple and accurate method for monitoring congestion.

My invention is also able to qualify point-to-multipoint, multipoint-to-point and n source to m destination connections. Prior art monitoring tools such as ping and traceroute cannot be used to qualify multipoint connections.

Finally, my invention may be used to identify and localize the source of network problems.

These and other advantages of my invention may be realized by reference to the drawings and detailed description described below.

DETAILED DESCRIPTION

Figure 1:
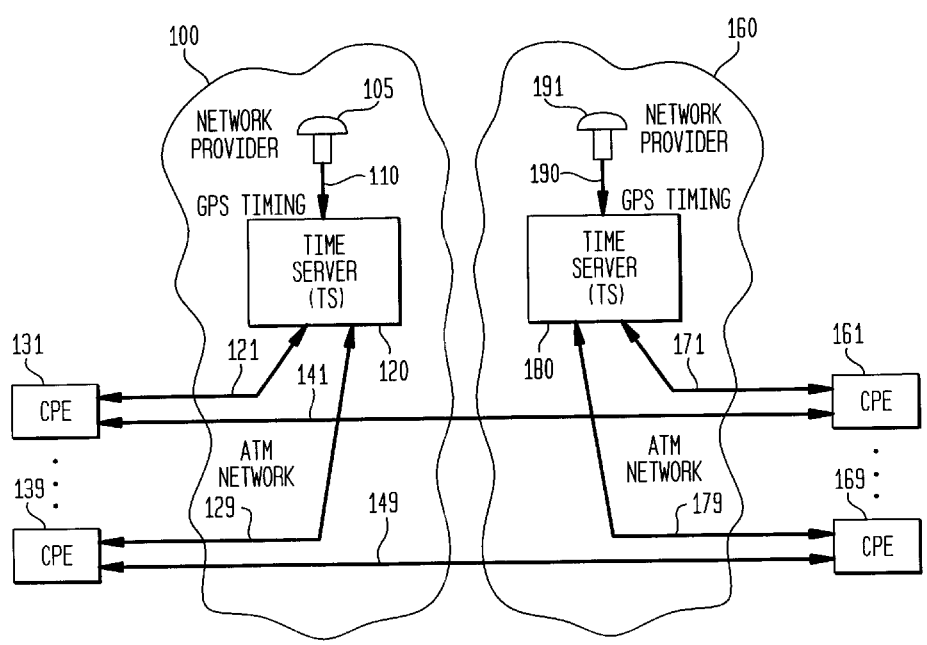
FIG. 1 is an Asynchronous Transfer Mode (ATM) network time service utilizing my invention.

Turning to FIG. 1 there is depicted an Asynchronous Transfer Mode (ATM) network time service utilizing my invention. Two timing networks, i.e., network 100 and network 160, are illustrated in FIG. 1. In network 100, a Global Positioning System (GPS) 105 provides timing 110 to a first network provider time server 120. The time server 120 in turn supplies frequency and universal time information 121 through 129 to customer premise equipment (CPE) 131 through 139, respectively. CPEs 131 through 139 transmit and receive information or data over paths or links 141 through 149 to CPEs 161 through 169, respectively, in timing network 160. CPEs 161 through 169 derive timing information along paths 171 through 179, respectively, from a second network provider time server 180. Time server 180 in turn uses GPS 191 as a source of timing 190. GPS 191 may be the same GPS as GPS 105 or an entirely different GPS. In accordance with my invention timing paths 121 through 129 and 171 through 179 are each a low bandwidth virtual connection of less than 16 kilobits/second (kb/s) that should have no affect on active user applications and specifically may advantageously be approximately 10 kHz.

Although FIG.1 depicts two timing domains, i.e., network 100 and network 160, my invention, as described below, can be implemented in any number of domains. In fact, as data flows back and forth between CPEs 161 and 131, for example, the data will traverse many timing domains each possibly being timed by a different time server. Furthermore, although FIG. 1 illustratively depicts only nine CPEs being supported within each domain, each time server is expected to support thousands of CPEs simultaneously.

Figure 2:
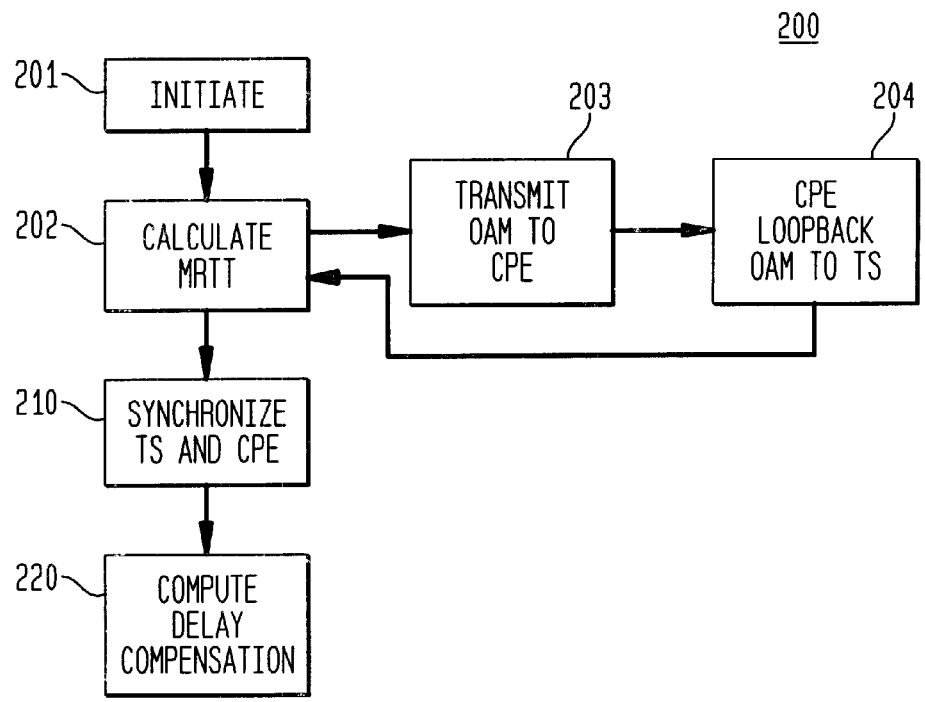
FIG. 2 is a state diagram illustrating the steps of a precise network time service in accordance with my invention.

Turning now to FIG. 2 there is depicted the method steps 200 for implementing a precise network time service on a timing network, such as timing network 100 of FIG. 1, in accordance with my invention. Initially, a user or CPE 131 initiates the process by requesting precise network timing service as illustrated by step 201. Step 201 can actually be done at any time the user establishes a network connection or when the CPE is powered up.

Responsive to the request for service, step 201, the time server 120 calculates the minimum reasonable delay (e.g., lowest 5 percentile) defined as a Minimum Round Trip Time (MRTT) between the time server 120 and the CPE 131, step 202. In calculating the MRTT, step 202, the time server 120 sends priority Operation, Alarm, and Maintenance (OAM) cells to CPE 131 via path 121 over the course of a few minutes at a rate of approximately 10 kHz, step 203. The CPE 131 then loops back the received OAM cells to the time server 120, step 204. Based on steps 203 and 204 the time server 120 is able to calculate the MRTT. It should be noted that in calculating the MRTT in accordance with my invention, step 202 should work well even if the CPE 131 is sending or receiving user traffic along data path 141 because it is assumed that a majority of the OAM cells may have experienced some queuing delays. Therefore, by taking the lowest 5 percentile the effects of queuing delays are ignored. Note, however, MRTT may be improperly calculated in accordance with my invention if: (1) CPE 131 or a competing CPE is sending or receiving Continuous Bit Rate (CBR) traffic on the link 121 that is used to connect the time server 120 to CPE 131; or (2) all the OAM cells are delayed through a source shaping/pacing mechanism or a User Network Interface/Network Network Interface (UNI/NNI) shaping mechanism. Step 202 may be continually repeated and filtered over the life of the connection to ensure that the MRTT value is accurate.

Figure 3:
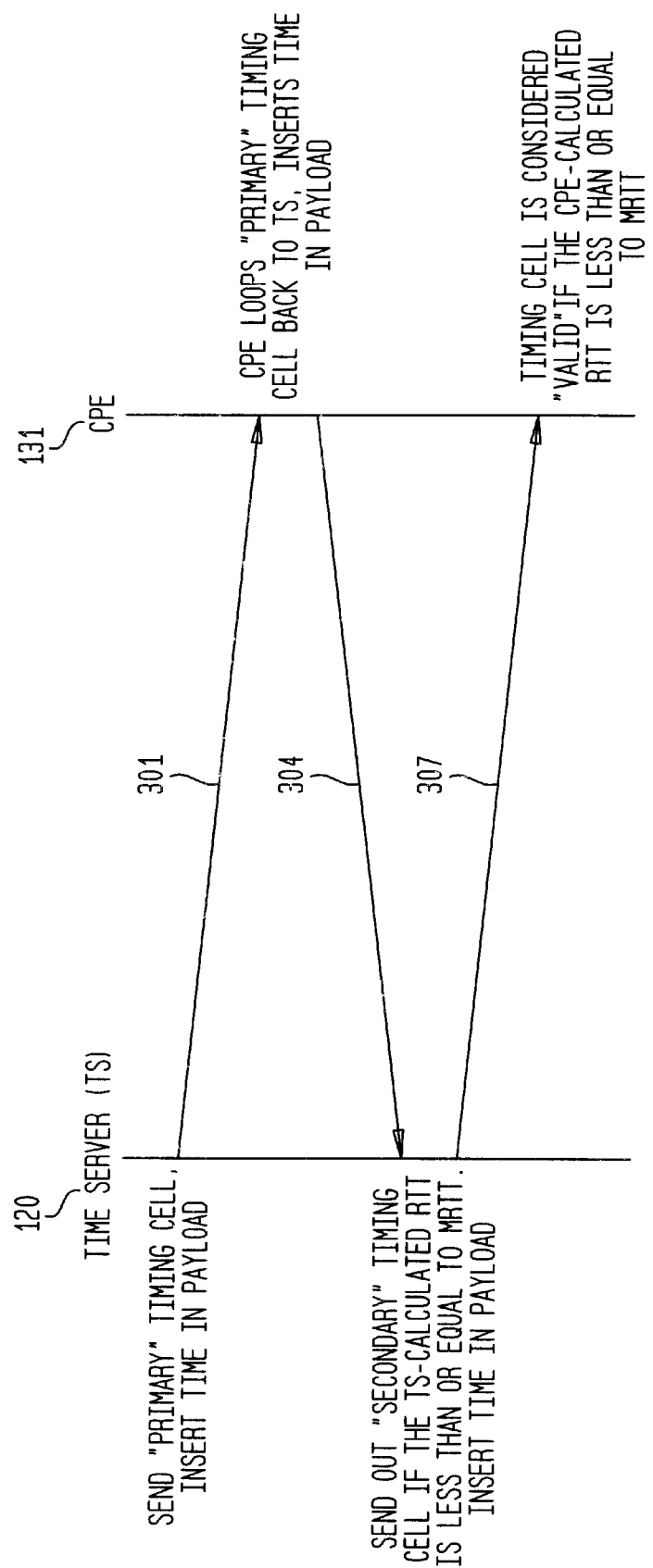
FIG. 3 is an illustrative state diagram of the substeps executed during one of the steps of FIG. 2.

The time server 120 and CPE 131 are then synchronized, step 210. The synchronization process, step 210, once initialized is repeated for the duration of the connection. The substeps for achieving synchronization are shown in FIG. 3. As FIG. 3 shows, the process is initiated by time server 120 sending a primary timing cell to the CPE 131, step 301. The primary timing cell sent by the time server 120 includes the time the primary timing cell was sent by the time server 120. The CPE 131 immediately loops back or returns the primary timing cell upon receiving it to the time server 120, while at the same inserting the time the CPE 131 sent the timing cell back to the server 120, step 304. The loopback performed as part of step 304 does not involve the host processor and operates similarly to ABR RM cells at the destination. If the calculated round trip time of the returned primary timing cell (at the server 120) is outside the MRTT, the returned primary cell is ignored and step 301 is repeated. On the other hand, if the time server 120 receives the returned primary timing cell within (less than or equal to) the MRTT, then it immediately sends a secondary timing cell to the CPE 131, step 307. If the CPE receives the secondary timing cell within the MRTT, then the secondary timing cell is considered a valid timing cell and is used to immediately synchronize the CPE timer. Of course, if the CPE-calculated round trip time is not within the MRTT then the process returns to step 301. Note however, that even where the CPE timer is synchronized according to steps 301, 304, and 307, the process is continually repeated. The CPE timer is synchronized to the time server using conventional filtering and phase locked loop methods.

Figure 4:
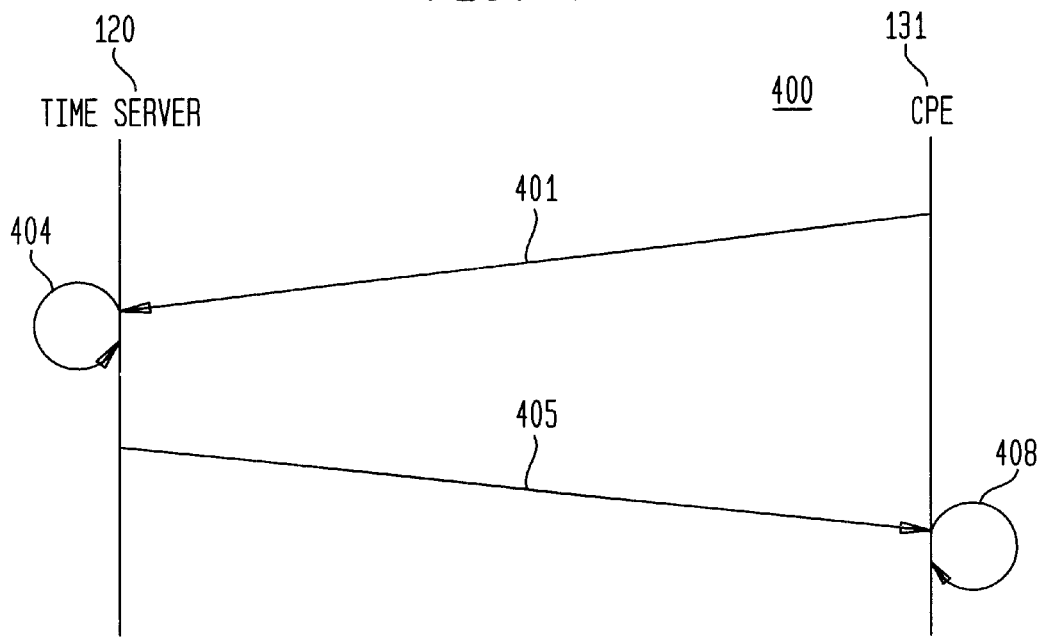
FIG. 4 is a state diagram illustrating the steps for compensating for different transmit or receive delay times as indicated in FIG. 2.

Once the time server 120 and the CPE 131 are synchronized, the minimum cell transfer delay is calculated at both the time server 120 and CPE 131 so different transmit/receive delays may be compensated for. In particular, and as shown in FIG. 4, the CPE 131 will send to the time server 120 an OAM timing cell that includes a transmit time stamp in the payload, step 401. The time server then uses the received OAM cell to compute the one way transfer delay by subtracting the transmit time of the cell from the actual time the OAM cell was received, step 404. Step 404 is repeated over a period of time to develop a set or plurality of one way transfer delays. The time server 120 then uses the results of repeating step 404 to calculate the minimum reasonable delay, which I have defined as the minimum cell transfer delay (MCTD), from the CPE 131 to the time server 120. Specifically, the minimum reasonable delay or MCTD is the lowest 5 percentile of the one way transfer delays from time server 120 to CPE 131. If the MCTD is one half of the MRTT, then the transmit/receive delays are the same.

The MCTD is also calculated in a similar manner from the time server 120 to CPE 131. Specifically, the time server 120 sends an OAM timing cell having a transmit time stamped in the payload to the CPE 131, step 405. Upon receiving this OAM cell the CPE 131 subtracts the transmit time from the actual received time, step 406, to compute a one transfer delay from the time server 120 to the CPE 131. As OAM cells having a time server 120 transmit time stamp are received at CPE 131, a plurality of time server 120 one way transfer delays are accumulated. The CPE 131 repeats the subtraction using the accumulated delays thereby computing the MCTD from the time server 120 to the CPE 131.

The sum of the MCTD in both directions should add up to the MRTT. In addition the process may be continually repeated and filtered to ensure accurate time server to CPE MRTT and vice versa.

The MCTD values computed are continually used by the host processor and the CPE timer to maintain the accuracy of the timing information. Specifically, the time server to CPE MCTD is always subtracted from the CPE timer whenever it is read by the host processor. As is known in the art, each incoming cell or frame includes a unique cell/frame identifier such as Virtual Path (VP)Nirtual Circuit (VC) identifier. Accordingly, the incoming time (adjusted for time server to CPE MCTD) can be logged in an on-board frame table. The frame table is accessed by the Virtual Path (VP)Nirtual Circuit (VC) and frame identifier and therefore a host processor can later access the frame table to determine the exact time any given frame was received. Likewise the time server to CPE MCTD value is always subtracted from the CPE timer before embedding a time stamp into outgoing traffic.

The end product of my invention may be used to improve network performance. For example, the timing information stored along with the table entries may be used to implement policies for deleting table entries. For example, a table entry may be deleted based on its age or via some least recently used algorithm.

In addition, my method allows for unidirectional and bidirectional delay measurements. Because my invention does not depend on end-to-end loop back timing, I am able to accurately measure unidirectional delay which is a fundamental improvement over the prior art. This represents an improvement over arrangements which can measure delay but usually rely on roundtrip times. As previously mentioned, prior art performance monitoring tools such as ping and traceroute cannot distinguish the difference between delays in the forward and reverse directions.

My invention is also able to accurately monitor one of the most common network problems, congestion. As was discussed above, the minimum end-to-end delay is one of the measurements automatically made by my invention. This value is a measure of the propagation and transmission delay, which is nearly constant for SONET/ATM networks.

This value may also be associated with an uncongested end-to-end connection (i.e., no additional queuing delays). Accordingly, values above the minimum value are usually suggestive of queuing delays or congestion assuming that the traffic is not being shaped/paced at the source or user network interface. As such, my invention offers a simple and accurate method for monitoring congestion in lieu of monitoring the queue lengths of all the nodes used in a virtual connection.

The above description is exemplary of my invention. Numerous modifications and variations may be made by those skilled in the art without departing from the scope and spirit of my invention.

I claim:

1. In a communications network having a time server and a plurality of customer premises equipments, a method for providing timing information between the time server and one of the customer premises equipments, said method comprising the steps of requesting, by one customer premises equipment, timing information from the time server;

sending, from the time server in response to the request, priority cells to the one customer premised equipment;

looping back said sent priority cells at the one customer premise equipment to the time server;

measuring a time difference between said sent cells and said looped cells based on when the cells were sent and received to calculate at the time server a minimum round trip time between the time server and the one customer premises equipment;

sending a primary timing cell from the time server to the one customer premises equipment;

looping, at the one customer premises equipment, the sent primary cell back to the time server; and synchronizing the one customer premises equipment to the time server if the round trip time between the one customer premise equipment and the time server of the primary timing cell, as calculated at the time server, is less than the calculated minimum round trip time, by sending a secondary timing cell from the time server to the customer premise equipment.

2. The method in accordance with claim 1 further comprising repeating said steps of sending a primary timing cell and looping the sent primary timing cell back to the time server, if the round trip time between the one customer premise equipment and the time server of the primary cell is greater than the calculated minimum round trip time, until the round trip time of the primary timing cell is less than or equal to said calculated minimum round trip time.

3. The method in accordance with claim 1 wherein said priority cells are operation, alarm, and maintenance (OAM) cells.

4. The method in accordance with claim 1 wherein said priority cells include a transmit time stamp.

5. The method in accordance with claim 1 further comprising the step of calculating a minimum cell transfer delay once the time server and the one customer premise equipment are synchronized.

6. The method in accordance with claim 5 wherein said minimum transfer delay calculation comprises the steps of:

sending an OAM timing cell having a time stamp from the one customer premise equipment to the time server;

subtracting, at the time server, said sent time stamp from the time said time stamped OAM timing cell was received at the server to produce a one way transmission delay;

repeating, at the time server, said subtracting step to form a plurality of one way transmission delays; and computing the minimum cell transfer delay from said plurality of one way delays.

7. The method in accordance with claim 6 wherein said minimum cell transfer delay is computed choosing the lowest five percentile from said plurality.

8. The method in accordance with claim 7 wherein said OAM cells are sent at a rate of approximately 10 kHz.

* * * * *